UNITED STATES PATENT OFFICE.

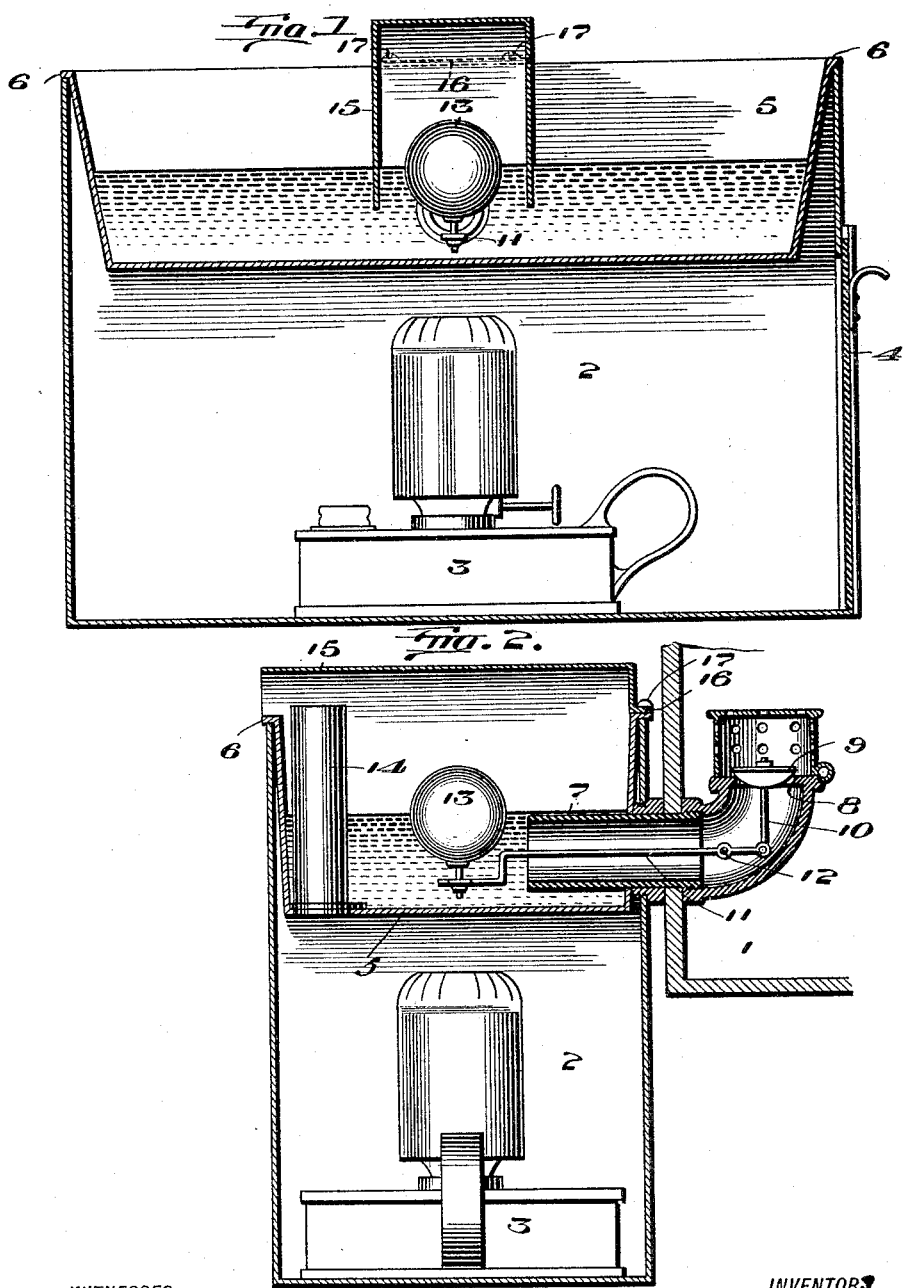

GUSTAVE C. PERSONS AND SHERMAN W. DOWNS, OF GREENE, IOWA.

STOCK-WATERER.

1,205,927. Specification of Letters Patent. Patented Nov. 21, 1916.

Application filed March 28, 1916. Serial No. 87,222.

*To all whom it may concern:*

Be it known that we, GUSTAVE C. PERSONS and SHERMAN W. DOWNS, citizens of the United States, residing at Greene, in the county of Butler and State of Iowa, have invented new and useful Improvements in Stock-Waterers, of which the following is a specification.

Our present invention pertains to non-freezing and water-economizing apparatus for watering hogs and other stock; and it has for one of its objects to provide an apparatus of the type named, embodying simple, inexpensive and durable means for effectually preventing stock from impairing or otherwise interfering with the heating and water-supplying means, and this while affording ample space for drinking.

Another object of the invention is the provision of a stock-watering apparatus which, in general, is simple and inexpensive in construction and is well adapted to withstand the weather and the rough usage to which devices of corresponding character are ordinarily subjected.

To the attainment of the foregoing, the invention will be fully understood from the following description and claim when the same is read in connection with the drawings, accompanying and forming part of this specification, in which:

Figure 1 is a longitudinal vertical section of an apparatus constructed in accordance with our invention. Fig. 2 is a central transverse section of the same with some of the parts in elevation.

Similar numerals of reference designate corresponding parts in all of the figures of the drawings.

Among other elements our improved apparatus comprises a source of water supply which is preferably in the form of a tank 1, as illustrated. The apparatus also comprises a casing 2, designed to contain a lamp 3, and having a vertically-slidable end door 4 for the convenient introduction and removal of the lamp when occasion demands.

Seated in the upper open side of the casing 2 is a trough 5, preferably of cast-iron, which is provided with flanges 6, designed to bear on the upper edges of the casing walls as illustrated. Leading from the interior of the tank 1, through the side walls of the casing 2 and trough 5, and into the said trough, preferably in about the transverse center thereof, is a water-supply pipe 7, and arranged to coöperate with a suitable seat 8 at the upturned tank end of the pipe is a cut-off valve 9. The said valve is provided with a stem 10 that depends in the vertically-disposed portion of the pipe, and is connected at its lower end to one arm of the lever 11, arranged and movable in the longitudinal portion of the pipe. Said lever is fulcrumed at 12, and with its inner arm, which extends into the trough, is connected a float 13 for the controlling of the passage of water from the tank to the trough.

A pipe 14 which extends upwardly through the bottom of the cast-iron trough 5 and is arranged in the transverse center thereof, is designed to conduct products of combustion from the chamber containing the lamp to a point above the water in the trough, and, at the same time, to admit sufficient air to said chamber to adequately support combustion.

Arranged in and on the trough and over the float 13 and pipe 14 is a guard 15, preferably of cast-iron, which has for its function to protect the said elements. The said guard comprises a top wall, side walls or skirts which are preferably shaped as shown with respect to the long walls of the trough so as to allow free passage of water to the open portions of the trough, and an end wall; the opposite end of the guard being open adjacent to the top wall, and the pipe 14 being located near said open end to permit of the entrance of air to the lamp chamber and the exit of products of combustion. At one end the upper portion of the guard bears on the adjacent side wall of the trough, and at its other end the guard is provided with a lip or flange 16 which bears on a complementary portion of the trough and is connected thereto by bolts 17 or other means, this in order to prevent stock from moving the guard incidental to use of the apparatus.

It will be manifest from the foregoing that notwithstanding the simplicity of our novel apparatus, the supply of water is reliably controlled and the water at all times is adequately heated, and there is no liability of the apparatus being put out of order by rough actions of stock.

The specific construction herein illustrated and described constitutes the best practical embodiment of our invention that we have as yet devised. It is obvious, however, that in the future practice of the invention, such changes in the construction, form and proportions of the parts may be made as fairly fall within the scope of our appended claim.

Having described our invention, what we claim and desire to secure by Letters-Patent, is:

A stock waterer comprising a casing open at its top, a trough arranged in said casing and bearing on the upper edges of the side walls thereof and having its bottom spaced from that of the casing and also having a pipe disposed in the transverse center of the trough and communicating with the space below its bottom and fixed to and extending upwardly from said bottom and arranged adjacent to one of the trough sides, a lamp arranged in the casing and below the trough, a water supply pipe extending through side walls of the casing and trough and into the trough, and arranged in the same transverse vertical plane as the upwardly extending pipe, a valve for controlling the passage of water through said pipe, a float arranged in the trough in transverse alinement with the upwardly extending pipe and the water supply pipe, means disposed in the water supply pipe and connecting the valve and the float, and a guard arranged transversely in and on the trough and connected thereto and having a top wall and an end wall and also having an open end arranged adjacent to the upwardly extending pipe and vertical skirts resting at opposite sides of and adjacent to the upwardly extending pipe, the float and the water supply pipe.

In testimony whereof we have hereunto set our hands in presence of two subscribing witnesses.

GUSTAVE C. PERSONS.
SHERMAN W. DOWNS.

Witnesses:
  AMOS INGALLS,
  B. PEDDYCOAC.

Copies of this patent may be obtained for five cents each, by addressing the "Commissioner of Patents, Washington, D. C."